July 30, 1957     H. SHEPARD     2,801,120
SWIVEL JOINT FOR ALUMINUM BOAT FITTINGS
Filed April 23, 1954
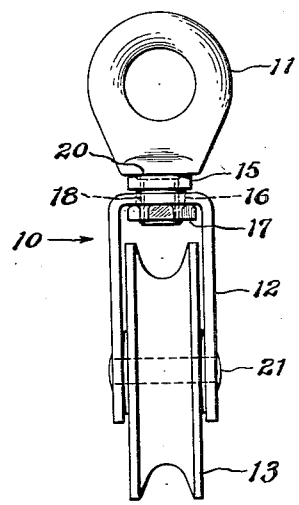
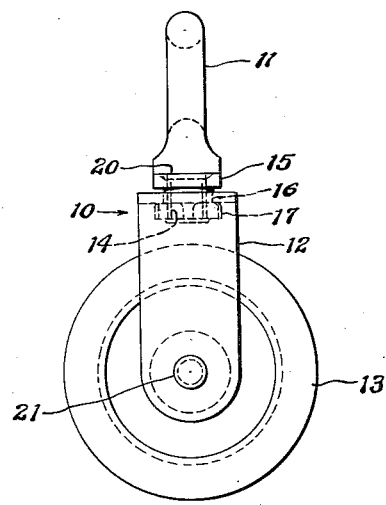
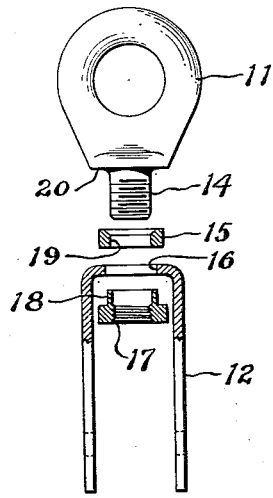
INVENTOR.
HARWOOD SHEPARD
BY
E. H. Schmidt, Jr
ATTORNEY

2,801,120

SWIVEL JOINT FOR ALUMINUM BOAT FITTINGS

Harwood Shepard, Auburn, N. Y.

Application April 23, 1954, Serial No. 425,152

4 Claims. (Cl. 287—91)

This invention relates to pulleys and is directed particularly to swivel eye pulleys of the type used in boating for guiding control lines.

Because of the corrosive action of weather and water, especially salt water, on metal, only a few metals and alloys are practicable for use in fabricating boat fittings. Solid brass and chrome plate fittings have been found suitable, but they are expensive. Brass, moreover, unless lacquered to protect the surface, tarnishes readily.

Certain aluminum alloys have been found to be especially desirable for use in the manufacture of boat fittings because of their light weight, their ability to maintain a high luster even when used on sea water, and because of their comparative cheapness. It has been found, however, that aluminum fittings having moving parts, such as swivel-joint pulleys, are not entirely satisfactory for the reason that the mechanical bearing surfaces of the fitting, because of the relative softness of aluminum, have a tendency to smear and stick, thereby interfering with proper operation of the fitting.

Accordingly it is one object of the invention to provide a non-corrosive hard bearing surface for moving parts in aluminum boat fittings.

It is another object to provide aluminum swivel-joint boat fittings with simple, effective and easily assembled bearing sleeve mechanism for forming a freely-operating swivel joint.

Still further objects and advantages of the present invention will appear from the more detailed description set forth below, it being understood that this description is given by way of illustration and explanation only, and that various changes therein may be made by those skilled in the art without departing from the spirit and scope of the appended claims.

In the drawings, wherein like reference numerals denote corresponding parts throughout the several views:

Fig. 1 is a front-elevational view of a swivel eye boat pulley according to the invention;

Fig. 2 is a side-elevational view of the pulley shown in Fig. 1; and

Fig. 3 is an exploded view, with portions broken away, of the bearing parts of the pulley shown in Figs. 1 and 2.

The numeral 10 in Figs. 1 and 2 of the drawings indicates a swivel-joint aluminum pulley. The pulley 10 comprises an eye member 11, a U-shaped pulley support member 12 and a pulley wheel 13, all of an aluminum alloy. The eye member 11 has an outwardly-extending threaded stud portion 14 around which is fitted a washer 15 of a hard metal, preferably stainless steel. The washer 15 is bored, as indicated by the numeral 19, to fit snugly on the stud portion 14. The washer 15 preferably is countersunk at the upper surface so as to fit in firm abutment against the square shoulder 20 of the eye member 11. The support member 12 is provided with an opening 16 through which the reduced diameter sleeve portion 18 of an internally-threaded stainless steel retaining nut 17 is adapted to pass for rotatory motion. The axial length of the sleeve portion 18 is such that when the swivel-joint pulley is assembled and the retaining nut 17 is tightened against the washer 15, there is sufficient clearance between the opposed inner surfaces of the washer and the nut to allow free rotation or swivelling of the eye 11 with respect to the support member 12. Loosening of the assembled joint can be prevent by peening the end of the stud portion 14 against the retaining nut 17.

The pulley wheel 13 is journalled between the arms of the support member 12 by means of a transverse pin 21, preferably of stainless steel tubing.

It will thus be evident that the invention provides a simple and effective stainless steel sleeve bearing between the aluminum eye member 11 and the pulley support member 12. Such a stainless steel bearing mechanism has been found to be entirely effective in providing long and trouble-free life in swivel-joint fittings of aluminum. The stainless steel parts, moreover, retain their luster and are highly resistant to corrosion.

While there has been disclosed in the specification only one form in which the invention may be embodied in practice, it is to be understood that this form is shown for the purpose of illustration only, and that the invention is not to be limited to the specific disclosure but may be modified and embodied in various other forms without departing from its spirit. In short, the invention contains all the modifications and embodiments coming within the scope of the following claims.

I claim:

1. A swivel joint for a pair of aluminum parts comprising a threaded stud extending from one of said parts, the diameter of said stud being of smaller size than the part from which it extends to provide a flange portion surrounding the base of said stud, a steel washer surrounding said threaded stud, an internally-threaded steel retaining nut threadable on said stud, said nut having a coaxial sleeve portion of reduced outer diameter, and an opening in the other of said parts rotatably fitted on said sleeve portion, said sleeve portion being greater in length than the depth of said opening, said retaining nut being tightened against said washer so that said washer abuts said flange portion and so that the end of said sleeve portion abuts the outer surface of said washer.

2. A swivel-joint fitting for boats comprising a pair of relatively pivoted aluminum parts, one of said parts comprising a planar base portion having an outwardly-extending central threaded stud portion of smaller diameter than said base portion and the other of said parts comprising an apertured planar surface, a stainless steel washer disposed on said stud portion and fitted against the former of said parts, and a retaining nut threaded on said stud portion, said nut comprising a reduced diameter sleeve portion forming at its inner end an annular shoulder on said nut and having its outer end in abutment with said washer, said washer being in abutment with said base portion, said washer and said nut providing a pair of opposed spaced annular surfaces, said apertured planar surface being rotatably disposed on said sleeve portion.

3. A swivel joint interconnecting a pair of parts, comprising a threaded stud extending from one of said parts, the diameter of said stud being of smaller size than the part from which it extends to provide a flange portion surrounding the base of said stud, a washer surrounding said threaded studs, an internally-threaded retaining nut threadable on said stud, said nut having a coaxial sleeve portion of reduced outer diameter, and an opening in the other of said parts rotatably fitted on said sleeve portion, said sleeve portion being greater in length than the depth of said opening, said retaining nut being tightened against said washer so that said washer abuts said flange portion and so that the end of said sleeve portion abuts the outer surface of said washer.

4. A swivel-joint fitting for boats comprising a pair of relatively pivoted parts, one of said parts comprising a planar base portion having an outwardly-extending central threaded stud portion of smaller diameter than said base portion and the other of said parts comprising an apertured planar surface, a washer disposed on said stud portion and fitted against the former of said parts, and a retaining nut threaded on said stud portion, said nut comprising a reduced diameter sleeve portion forming at its inner end an annular shoulder on said nut and having its outer end in abutment with said washer, said washer being in abutment with said base portion, said washer and said nut providing a pair of opposed spaced annular surfaces, said apertured planar surface being rotatably disposed on said sleeve portion.

References Cited in the file of this patent
UNITED STATES PATENTS

| | | |
|---|---|---|
| 834,392 | Mead | Oct. 30, 1906 |
| 1,594,930 | Davis | Aug. 3, 1926 |
| 2,195,997 | Perkins | Apr. 2, 1940 |